_United States Patent Office_ 3,086,864
Patented Apr. 23, 1963

3,086,864
METHOD OF SUPPRESSING GASTROINTESTINAL UREASE ACTIVITY
Willard J. Visek, Chicago, Ill., assignor to the United States of America as represented by the United States Atomic Energy Commission
No Drawing. Filed Mar. 10, 1961, Ser. No. 94,948
4 Claims. (Cl. 99—4)

The invention relates to a novel method of suppressing the activity of urease in the gastrointestinal tract of an animal, more particularly over an extended period of the growth of an animal in order to increase its growth rate and feeding efficiency.

The enzyme urease is practically always present in the intestinal tracts of animals, where it is continuously generated by several types of intestinal bacteria. As its name indicates, urease brings about the breakdown of urea within the tract into ammonia and carbon dioxide; this action, which apparently confers no particular advantage on the bacteria, was for a long time regarded as indifferent with respect to the host animal as well.

Recently, however, experiments by the applicant have demonstrated that if the activity of urease within the intestinal tract can be suppressed the growth rate and feeding efficiency of an animal are both markedly increased; applicant's earlier experiments to this effect are outlined in an abstract published in the March 1960, issue of the Federation Proceedings of the Federation of American Societies for Experimental Biology, vol. 19, No. 1, Part I, and in the November 1960, issue of the Proceedings of the Society of Experimental Biology and Medicine, vol. 105, pages 164–167. Later experiments by applicant, including experiments on chickens, have substantiated the results of the earlier experiments.

In the experiments above referred to, the activity of the urease in the intestinal tract was supressed by subcutaneously injecting in small amounts and over an extended period purified urease derived from jackbeans; since urease is an antigen not normally present in the blood, its injection causes the system of the injected animal to generate antiurease, which, in turn, suppresses the activity of the urease in the intestinal tract. When this is carried out often enough, an improvement in growth rate and feeding efficiency results, which, it is believed, is due to the fact that ammonia is no longer generated within the tract, or at least in very greatly reduced amounts. When urease activity is unsuppressed, appreciable quantities of ammonia diffuse through the intestinal walls into the blood, from which it is extracted by the liver which resynthesizes it into urea. While there is some question whether this is harmful or not in a general way, there is no doubt that the resynthesizing process requires energy, and the saving of this energy when ammonia generation is suppressed may well account for the favorable results with respect to growth rate and feeding efficiency. While this explanation appears to be probable, I do not wish, of course, to be rigorously bound by it; my invention is offered on the basis of my empirical findings made through actual experiments.

Some rather serious drawbacks are inherent in the method of suppressing urease activity by means of subcutaneous injections of urease. Urease is a definite antigen to which individual animals may be highly sensitive. Even when this is not important, the labor requirements for repeatedly injecting large numbers of animals such as chickens may well make the method economically impractical.

It is an object of the invention to provide a novel method of suppressing the activity of urease within the intestinal tract of an animal.

It is accordingly a more particular object of the invention to provide an economically practical method whereby the activity of urease within the intestinal tract of an animal may be suppressed.

It is a more particular object to provide a method for suppressing the activity of urease in the intestinal tracts of large numbers of growing animals without the need for making subcutaneous injections into the animals.

It is a more particular object to provide a method for increasing the growth rate and feeding efficiency of growing animals without subcutaneous injection.

It is a further object to provide a nutritive animal feed containing a urease suppressant.

All the foregoing objects are attained by my discovery that urease activity within the intestinal tract of an animal may be suppressed by small repeated dosages over a period of time of certain cyclic acyl substituted ureas having urease suppressant properties. Not all cyclic acyl substituted ureas have suppressant properties, but quite a number of them do, including the class consisting of alloxan (2,4,5,6-tetraoxohexahydropyrimidine), murexide (acid ammonium purpurate), and barbituric acid (2,4,6-trioxohexahydropyrimidine).

Certain cyclic acyl substituted ureas have hypnotic properties; consequently, a non-hypnotic member having urease suppressant properties should be selected, or at least one whose hypnotic properties are sufficiently weak that no harmful side effects result. When it is desired to suppress urease activity in order to simplify blood chemistry for the purposes of an experiment, certain suppressants are preferable over others; for example, alloxan, which is of comparatively simple molecular structure, is preferable in most cases over murexide whose molecule has a larger number of functional groups which might react with the other reagents used in the experiment. Mixtures of suppressants may be used in some cases.

As above stated, for urease activity to be effectively suppressed in order to bring about improvements in growth rate and feeding efficiency of animals, the suppressant must be administered in small dosages over a period of time. I have found it to be economical, and prefer, administration by mixing the urease suppressant directly in the animals' feed in amounts effective to suppress urease activity in the gastrointestinal tract.

I have found that 0.001 mole of suppressant per kilogram of feed to be about the least that can be administered and still secure a substantial suppression of urease activity, and that as the dosage is increased through the millimolar range to about 0.005 mole all suppressants are quite effective. When the centimolar dosage range is reached, for example, when 0.01 mole of suppressant are added to each kilogram of feed, the suppression of activity is even greater, although at this level murexide produces some detrimental effects, although not to a serious extent, and the other suppressants still appear to be harmless. However, due to the detrimental effects mentioned caution dictates that as the dosage is increased in the centimolar range care be used, and as soon as detrimental effects become evident no further increase be made.

I prefer, for chicks, 0.01 mole of alloxan, barbituric acid, or murexide for each kilogram of feed beginning at birth of the animals until their growth attains the degree desired. Administration in the feed of any of alloxan, barbituric acid, or murexide at the preferred rate produces a decrease in urease activity in the intestines of chickens by 80% or more, in the small intestines, and up to 65.0% in the intestinal tract as a whole, as will be seen in more detail from the following examples:

EXAMPLE I

Four groups of five male chicks of identical size and breed were housed, fed, and otherwise given the same environmental conditions from birth until sacrifice on their twenty-eighth day. The control, or basal group, was given no urease suppressant, and the other three groups had 0.01 mole of suppressant mixed with each kilogram of their feed. The suppressant for one group was alloxan, for a second barbituric acid, and for the third murexide. At sacrifice, the intestinal tracts of the chicks were separately macerated in .85% NaCl aqueous solution and then each was placed in a closed vessel and the urease activity was determined by reacting the macerated suspension with a measured amount of urea in a diabasic sodium phosphate buffer. The ammonia thus produced was led to a second vessel containing sulfuric acid. The ammonia in the gases was absorbed by the sulfuric acid and determined as ammonia nitrogen by the standard Kjeldahl procedure. The results of this experiment are set forth in Table I below; a unit of "Activity" is defined as the amount of urease required to produce 1 mgm. of ammonia nitrogen at 20° C. at neutral pH in a saline phosphate buffer acting upon a urea substrate. The third column from the left shows the urease activity in such units per gram of dry weight of the macerated intestines and the right column shows the percent of inhibition as compared to the control, or basal group receiving no urease suppressant.

Table I

| Chicken groups | No. of chickens | Activity, Units/g. dry wt. | Inhibition, percent |
|---|---|---|---|
| Basal | 1 | 7.90 | |
|  | 2 | 12.00 | |
|  | 3 | 10.45 | |
|  | 4 | 7.46 | |
|  | 5 | 22.04 | |
| Average |  | 11.97 | |
| Alloxan | 6 | 4.69 | |
|  | 7 | 3.67 | |
|  | 8 | 9.32 | |
|  | 9 | 5.86 | |
|  | 10 | 10.99 | |
| Average |  | 6.91 | 42.2 |
| Barb. acid | 11 | 9.34 | |
|  | 12 | 4.03 | |
|  | 13 | 8.73 | |
|  | 14 | 7.85 | |
|  | 15 | 5.65 | |
| Average |  | 7.12 | 40.5 |
| Murexide | 16 | 3.30 | |
|  | 17 | 4.02 | |
|  | 18 | 5.47 | |
|  | 19 | 3.63 | |
|  | 20 | 4.45 | |
| Average |  | 4.17 | 65.0 |

EXAMPLE II

Four groups of similar male chicks, each of six chicks except one group of seven, were treated in the same manner as the chicks in Example I except that at sacrifice the small intestines were separated from the large intestines, placed in separate vessels and their urease activity determined separately. The results of this experiment are set forth in Table II.

Table II

| Diet | No. of chickens | Small Intestine Activity, Units/gm. | | Large Intestine Activity, Units/gm. | |
|---|---|---|---|---|---|
| | | Dry Basis | Wet Basis | Dry Basis | Wet Basis |
| Barb. Acid | 1 | 2.88 | 1.91 | 2.15 | 7.14 |
|  | 2 | 2.54 | 2.02 | 1.74 | 3.08 |
|  | 3 | 3.35 | 1.83 | 2.67 | 3.24 |
|  | 4 | 3.41 | 2.53 | 1.96 | 3.41 |
|  | 5 | 2.82 | 2.44 | 2.99 | 5.17 |
|  | 6 | 4.72 | 3.05 | 3.68 | 4.50 |
| Average |  | 3.27 | 2.30 | 2.53 | 4.42 |
| Murexide | 7 | 3.02 | 2.38 | 1.92 | 5.20 |
|  | 8 | 2.90 | 2.70 | 2.49 | 2.78 |
|  | 9 | 2.75 | 2.47 | 2.11 | 3.84 |
|  | 10 | 2.53 | 2.91 | 2.40 | 5.67 |
|  | 11 | 3.29 | 3.39 | 2.50 | 5.15 |
|  | 12 | 2.74 | 1.71 | 2.81 | 3.26 |
|  | 13 | 2.78 | 2.71 | 2.69 | 6.21 |
| Average |  | 2.86 | 2.61 | 2.42 | 4.59 |
| Basal | 14 | 20.96 | 16.50 | 3.44 | 4.89 |
|  | 15 | 12.95 | 11.86 | 4.40 | 4.71 |
|  | 16 | 46.73 | 26.62 | 2.76 | 4.87 |
|  | 17 | 34.61 | 29.54 | 2.54 | 3.93 |
|  | 18 | 2.94 | 3.01 | 2.18 | 4.70 |
|  | 19 | 3.12 | 2.03 | 2.48 | 5.34 |
| Average |  | 20.22 | 14.93 | 2.97 | 4.74 |
| Alloxan | 20 | 3.56 | 1.85 | 4.04 | 4.74 |
|  | 21 | 3.06 | 2.43 | 2.88 | 5.55 |
|  | 22 | 2.75 | 2.69 | 2.78 | 6.33 |
|  | 23 | 2.85 | 2.61 | 2.61 | 6.87 |
|  | 24 | 3.19 | 2.97 | 2.92 | 4.97 |
|  | 25 | 6.29 | 4.93 | 3.78 | 7.57 |
| Average |  | 3.62 | 2.91 | 3.17 | 6.00 |

SUMMARY OF INHIBITION IN CHICKEN GUTS

| Diet | No. of Chickens | Inhibition in Small Intestine, percent | | Inhibition in Large Intestine, percent | |
|---|---|---|---|---|---|
| | | Dry Basis | Wet Basis | Dry Basis | Wet Basis |
| Basal (control) | 6 | | | | |
| Alloxan | 7 | 82.09 | 80.50 | | |
| Barb. Acid | 6 | 83.82 | 84.59 | 14.81 | 6.78 |
| Murexide | 6 | 85.85 | 82.51 | 18.51 | 3.16 |

It will be noted from the foregoing Table II that the percentages of inhibition of urease activity within the small intestine were quite large, that brought about by barbituric acid being 83.82%, and those of murexide and alloxan being 85.85% and 82.09% respectively, these figures being arrived at from the "Dry Basis" data. No such reduction, of course, is to be found from the data concerning the large intestines, but inasmuch as the wall area of the small intestines is much greater than the wall area of the large intestines, it appears desirable that the suppression of activity take place in the small intestines in order to prevent the diffusion of ammonia through the walls.

It will be understood that this invention is not to be limited to the details given herein, but that it may be modified within the scope of the appended claims.

What is claimed is:

1. A method of increasing the growth rate and feeding efficiency of a growing chick, comprising mixing at least 0.001 mole of a member selected from the class consisting of alloxan, murexide, and barbituric acid with each kilogram of the feed of the chick from birth until its growth is substantially complete.

2. A composition which comprises a nutritive chick feed together with a cyclic diacyl substituted urea having urease suppressant properties in amounts effective to suppress urease activity in the gastrointestinal tract.

3. A composition which comprises a nutritive chick feed each kilogram of which having mixed therewith a member selected from the class consisting of alloxan, murexide, and barbituric acid in from millimolar to centimolar amounts.

4. A composition which comprises a nutritive chick feed each kilogram of which having mixed therewith at least 0.001 mole of a cyclic diacyl substituted urea.

References Cited in the file of this patent
UNITED STATES PATENTS 2,831,795    Hymas  ---------------- Apr. 22, 1958

OTHER REFERENCES

Pearson et al.: Biochem. Jour. 37 (1943), pages 148–164.